United States Patent [19]

Wang et al.

[11] Patent Number: 4,787,681
[45] Date of Patent: Nov. 29, 1988

[54] SIMULATED CUSTOM WHEELS

[76] Inventors: Mike Wang, 2044 W. 236th Pl., Torrance, Calif. 90501; David Gaines, 28761 Charreadas, Lugan Beach, Calif. 92677

[21] Appl. No.: 140,613

[22] Filed: Jan. 4, 1988

[51] Int. Cl.$^4$ .................................................. B60B 7/06
[52] U.S. Cl. .................................. 301/375; 301/37 R; 301/108 S
[58] Field of Search ............... 301/375, 37 R, 37 CM, 301/37 N, 37 SC, 37 L, 108 R, 108 S, 108 SC, 108 A

[56] References Cited

U.S. PATENT DOCUMENTS

| 4,217,002 | 8/1980 | Simpson | 301/37 S |
| 4,240,670 | 12/1980 | Zorn et al. | 301/37 S |
| 4,606,582 | 8/1986 | Warren | 301/37 S |

Primary Examiner—James B. Marbert
Attorney, Agent, or Firm—Singer & Singer

[57] ABSTRACT

A Simulated Custom Wheel suitable for automotive wheels or truck wheels is described and which is suitable for use on either Ford wheels of General Motor wheels. A unique retainer ring is placed against a decorative cover which is placed adjacent to the wheel. The ring has a flanged rim on the periphery which defines a shoulder portion. The flanged rim is positioned so as to point away from the wheel, and the lug nuts are assembled in the conventional fashion for the Ford wheels. The General Motor wheels use a solid retainer plate against the retainer ring. A universal center hub also having a flanged rim on the periphery defining a shoulder portion is adapted to frictionally engage the shoulder portion on the retainer ring whereby the center hub is supported and held only by the frictional relationship existing between the shoulder on the retaining ring and the shoulder portion on the center hub. In the preferred embodiment, decorative lug nut covers are attached to the universal center hub thereby providing a wheel that is completely covered.

7 Claims, 2 Drawing Sheets

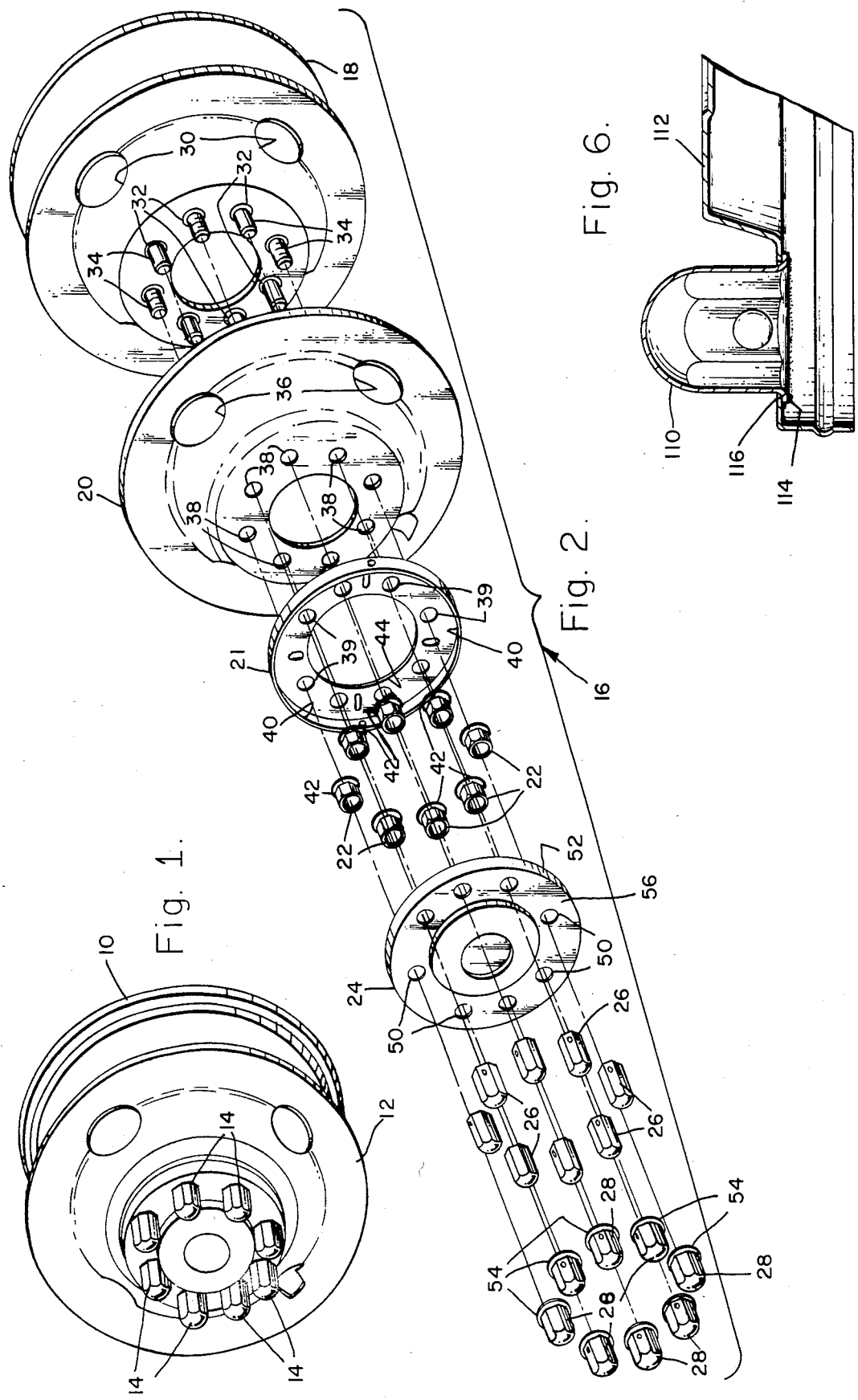

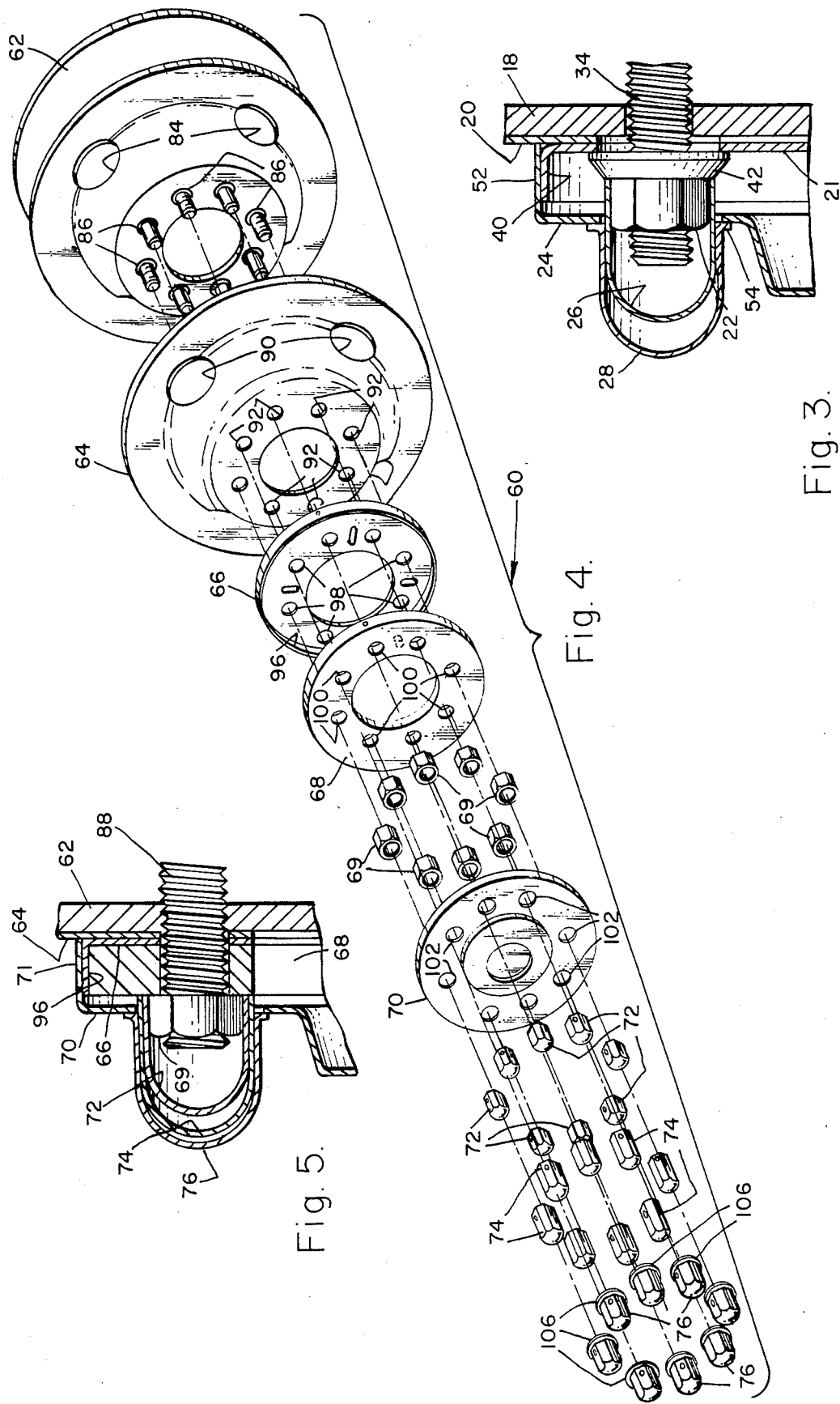

SIMULATED CUSTOM WHEELS

There is described a decorative wheel cover and more particularly a universal decorative wheel cover that is adapted to be used both on Ford wheels and also on General Motor wheels.

In the art as practiced today, it has become quite fashionable for modern families to own and drive heavy duty vehicles such as Vans and Trucks for sport and also for everyday transportation.

The motor Van, once used only for vacation, is now used as an everyday transportation vehicle and similarly the light truck and the heavy duty truck having dual wheels in the rear are now dressed up and made very attractive with fancy paint schemes and decorative wheels so as to be very ornamental and attractive and acceptable as an everyday vehicle. It is also quite common for heavy duty truckers to make their cabs as attractive as possible and that includes chrome plating, attractive ornaments, deluxe interiors, and chrome wheels on both dual driving wheels and the forward steering wheels.

Unfortunately, it has become expensive to properly chrome all four wheels on an automobile and also to chrome the dual wheels used on trucks, Vans and motorhomes and to maintain these wheels in a prestine condition as is the want of the owner. Adding to the expense of these costs, is the necessity to chrome the spare wheel or wheels used on these vehicles which unfortunately adds to the cost and the upkeep.

It has also become apparent to the owners of these heavy duty vehicles that removing the wheel, changing the tires, and using their vehicles in off road conditions increases the damage to the wheels which again necessitates added costs and repairs and replacement.

In an effort to lower the cost of maintaining attractive wheels to the user, the market has developed a decorative wheel covering for Vans, trucks and automobiles. These decorative wheel covers require the user to only purchase a set of four wheels for his vehicle thereby eliminating the need for a spare since the covers can be removed by the user at will. It is also possible for the user to remove the decorative wheel cover from the vehicle when the vehicles are to be used in off road conditions thereby minimizing damage to the decorative covers when the vehicles are not used in their ordinary transportation mode.

The decorative wheel cover also allows the user to enhance the appearance of the wheel and the lug nuts used to maintain the wheel on the axle. It has become very fashionable for users to place decorative lug nut covers over the vehicle lug nuts in order to enhance the size of the lug nut and give the wheel a larger appearance than it would otherwise have. This concept of using lug nut covers to cover the lug nuts of the vehicle allows the user to obtain a visual appearance of having a much larger wheel with larger lug nuts then is otherwise necessary for the vehicle itself. This lends a certain amount of mechanism to the user and is highly desirable by those users wanting to enhance the appearance and the attractiveness of their vehicles.

An example of the prior art is U.S. Pat. No. 4,606,582 issued Aug. 19, 1986 to Perry A. Warren and which is entitled "Decorative Wheel Covering". This patent discloses how the decorative wheel cover can be placed against the wheel of either a Van, truck, or automobile to enhance the attractiveness of the wheel and at a cost that is less then producing a chrome wheel with chrome lug nuts.

Unfortunately, the Warren patent is not adaptable to both Ford wheels and Chevrolet wheels because of the inherent difference in manufacture of both wheels and the fact that studs on the General Motor wheels are shorter and closer together and thereby require a solid retainer plate that is not used or required on Ford wheels. On the other hand, the Ford studs are both larger in diameter and longer and use locking nuts having an attaching flange which eliminates the need for the solid retainer plate used by the General Motors cars.

In the present invention, there is described a universal simulated custom wheel particularly adapted for use with vehicles equipped with dual rear wheels of the type manufactured by Ford and General Motors and which provides the necessary covering of both the wheel and the lug nuts.

In the present invention, the decorative wheel cover has a substantially concave shape and matching holes adapted to accept the attaching studs associated with the wheels and is place against the wheel in the conventional matter. A circular retaining ring having a flanged rim on the periphery and defining a shoulder portion is located adjacent the wheel cover with the shoulder portion pointing away from the attaching wheel whereby the attaching studs project through the cover and the retaining ring. A plurality of lug nuts fixedly attaches the retaining ring, the decorative wheel cover and the wheel together.

In the Ford installation, the conventional Ford lug nuts have a flanged ring area which bear against the retaining ring. In the General Motors installation, the conventional solid retaining plate is supplied by the General Motors wheel and is used together with the lug nuts supplied by General Motors.

A universal center hub adaptable for either the Ford or General Motors wheels contains a flanged rim on the periphery defining a shoulder portion adapted to frictionally engaged the shoulder on said retaining ring whereby the center hub is supported and held only by the frictional relationship existing between the shoulder portion on the retaining ring and the shoulder portion on the center hub. In addition, the universal center hub contains matching holes aligned with the studs and which have a diameter sufficient to expose the lug nuts. In other words, the universal center hub is capable of being removed by the vehicle owner without dismantling the wheel by simply pulling the hub off and disengaging the frictional relationship between the hub and the retaining ring.

In the preferred embodiment, a plurality of lug nut extension members are each placed over the lug nuts in a frictionally engaging relationship. The lug nut extenders project beyond the hole in the center hub and allows the user to place decorative lug nut covers over the extension members to thereby enhance and simulate larger lug nuts on the wheels. In one embodiment, the decorative lug nut covers contain flanges on the bottom most portion which bear against the center hub to give the illusion of heavy lug nuts holding the wheel in place.

In still another embodiment, the decorative lug nut covers are physically attached to the universal center hub thereby eliminating the need of lug nut extenders or frictionally engaging lug nut decorative covers. Simply placing the center hub in position with the attached lug nut decorative covers will complete the installation and give the appearance of large decorative lug nuts holding the wheel in place.

The defined assemblage is capable of being used with both Ford wheels and General Motor wheels and provides the user with a complete and inexpensive ornamental package for enhancing the attractiveness of his wheels and the attaching lug nuts by simulating custom wheels and at a very low cost.

Further objects and advantages will be made more apparent by referring now to the accompanying drawings where there is shown:

FIG. 1 is a perspective drawing illustrating a simulated custom wheel created according to the teachings of this invention;

FIG. 2 is an exploded view of a Ford wheel having a decorative cover and decorative lug nut covers;

FIG. 3 is a partial cross-sectional view of a Ford lug nut assembly;

FIG. 4 is an exploded view of a Chevrolet wheel having a decorative wheel cover and decorative lug nut covers;

FIG. 5 is a cross-sectional view of a Chevrolet lug nut; and

FIG. 6 illustrates another embodiment of attaching the decorative lug nut cover directly to the universal center hub.

The universal decorative wheel covers described herein is adaptable for use with either Ford wheels or General Motors wheels and is intended to provide a covering for single wheels or dual wheels whether they are automotive wheels or light trucks wheels or Van wheels.

Up to the present time, it has been impossible for a manufacturer to produce a universal wheel cover capable of being used on both the Ford and Chevrolet vehicles because of the different construction techniques used by the car manufactures. As mentioned above, the Ford studs are larger and the lug nuts have a flanged base portion in order to obtain a greater bearing surface area. The Chevrolet wheels on the other hand use a smaller stud that is placed closer to the hub and which requires the use of a solid retainer plate to obtain the necessary bearing strength and because of the small size small lug nut are used. These physical differences have made it impossible to produce a universal cover capable of being used on both Chevrolet and Ford wheels until the advent of the present invention.

Referring now to FIG. 1, there is shown an illustration of a dual wheel 10 having a wheel cover 12 apparently held in place by lug nuts 14. In reality, FIG. 1 illustrates a complete simulated custom wheel in which the wheel 10 may be either a Ford wheel or a Chevrolet wheel and in which the apparent lug nuts 14 are in reality decorative lug nut covers which actually cover the lug nuts and thereby present a more pleasing appearance. The wheel cover 12 and the apparent lug nuts 14 are chrome covered and the size of the covers 14 is chosen in order to give the wheel a more massive appearance dictated only by the caprice of the owner.

Referring now to FIG. 2, there is shown an exploded view of a wheel assembly 16 comprising a Ford wheel 18, a wheel cover 20, a retainer ring 22, a plurality of lug nuts 22 a universal center hub 24, a plurality of lug nut extenders 26 and a plurality of decorative lug nut covers 28.

The Ford wheel 18 is conventional in character and contains a plurality of openings 30, for accessing air to the brake drums and a plurality of holes located in a circle 32 for allowing a plurality of studs attached to the brake drum to pass therethrough. Located adjacent to the wheel 18 is a wheel cover 20 which also contains a plurality of openings 36 adapted to match with the openings 30 on the wheel 18 in order to allow cooling air to pass through to the brake drum. The wheel cover 20 also contains a plurality of holes 38 aligned with the holes 32 on the wheel 18 and adapted to allow studs 34 to pass therethrough. The exterior surface of the wheel cover 20 is chrome plated to a high finish in order to obtain the pleasing appearance desired by the user.

The retaining ring 21 is held adjacent to the wheel cover 20 and contains a flanged rim 40 on the periphery of the ring which defines a shoulder portion that is adapted to point away from the attaching wheel 18 when held in the adjacent position. Located on the ring 1 is a plurality of holes 39 aligned with holes 38 on the cover 20 for allowing studs 34 to pass therethrough.

The complete assembly is attached together and held to the drum by means of the Ford lug nuts 22 that each contain a flanged portion 42 that is adapted to bear against the inside surface 44 of the retaining ring 21.

The universal center hub 24 also contains a plurality of matching holes 50 that are aligned with the studs 34 attached to the brake drum and in which each hole 50 has a diameter sufficient to expose the lug nuts 22. The studs on the General Motor whe... being smaller may not extend through the opening 50 on hub 24.

The universal center hub 24 also contains a flanged rim 52 on the periphery which defines a shoulder portion adapted to frictionally engage the shoulder portion formed by the flanged rim 40 on the retaining ring 21 thereby allowing the center hub to be supported and held only by the frictional relationship existing between the shoulder portion 52 on the hub 24 and the shoulder portion 40 formed on the retaining ring 21.

In all probability, the individual lug nuts 22 will not extend through the openings 50 in the hub member 24 because of the thickness of the retaining ring 21 and the wheel cover 20.

In one embodiment, a plurality of lug nut extension members 26 each adapted to frictionally engage the exterior portion of the lug nuts 20 are each inserted through an individual hole 50 in the hub member 24. The length of the extension 26 is chosen to extend beyond the hole 50 located in the hub number 24. Each decorative lug nut cover 28 preferably has a flanged member 24 located at one end of the decorative lug nut and is adapted to fit over and frictionally engaged lug nut extending members 26 a sufficient distance to allow the flanged member 54 of the decorative lug nut cover 28 to bear against the flat plate 56 of the universal center hub 24.

The exposed portions visible to the viewer include the wheel cover 20, the universal center hub 24 and the decorative lug nut covers 28 which are all chrome plated and fashioned to be as attractive as possible, thereby making the wheel as attractive-looking as possible.

For those users desiring the appearance of a large lug nut, it is only necessary to use a larger size decorative lug nut cover 28 to give the massive visual impression that some users desire.

Referring now to FIG. 3, there is shown a partial cross-sectional view of FIG. 2 illustrating how the lug nut 22, containing the flanged shoulder 42, holds the ring 21, the wheel cover 20, and the wheel 18 together in a fixed relationship. The rim 52 on the hub 24 and the rim 40 on the ring 21 is also shown in a frictional relationship for holding the hub 24 in place. The lug nut extender 26 is also shown in place frictionally engaging the nuts 22 and bearing against the flanged shoulder 42 associated with each locking nut 22. In this fashion, the decorative lug nut cover 28 is frictionally located over the extender 26 and presents the finished appearance of a lug nut holding the assembled parts.

In this fashion, all of the equipment issued by Ford as originally issued is used and no structural changes are made other than to include the added decorative portions including the wheel cover 20, the retaining ring 21, and the hub member 24, together with the decorative lug nuts 28.

Referring now the FIG. 4, there is shown an exploded view of a Chevrolet wheel containing the decorative attachments necessary to assemble a simulated custom wheel. The exploded wheel assembly 60 includes a Chevrolet wheel 62, a decorative wheel cover 64, a circular retaining ring 66, a circular solid Chevrolet retaining plate 68, a plurality of lug nuts 69, a universal center hub 70, a plurality of different size lug nut extenders 72 and 74, and a plurality of decorative lug nut covers 76.

The wheel 62 is illustrated as a dual wheel of the type used on the back wheels of trucks or heavy duty vehicles. The wheel 62 contains a plurality of ventilation holes 84 used to allow air to pass through and into the brake drums. A plurality of openings 86 is arranged and located to allow studs 88 associated with the brake drum to pass therethrough.

A wheel cover 64 similar to the wheel cover 20 illustrated in FIG. 2, also contains a plurality of ventilation openings 90 aligned with the ventilation openings 84 located on the wheel 62. Also located on the wheel cover 64 is a plurality of openings 92 that are aligned with the openings 86 on the wheel 62 and which allow studs 88 associated with the brake drums to pass therethrough.

The circular retaining ring 66 is similar in all respects to the circular retaining ring 21 illustrated in connection with FIG. 2 and also contains a flanged rim 96 on the periphery defining a shoulder portion and which is located adjacent to the wheel cover 64 in such a way that the projection of the shoulder portion points away from the adjacent cover 64. The retaining ring 66 also contains a plurality of openings 98 aligned with the openings 92 in the wheel cover and which allow the studs 88 associated with the brake drum to pass therethrough.

The differences between the Ford wheel assembly and the Chevrolet wheel assembly is associated with the fact that the studs 88 located on the Chevrolet wheel are smaller in diameter and are located a little closer to the center line than on the Ford wheel; and in addition, the Chevrolet wheel requires the use of a circular solid plate 68 to complete the assembly. The solid retainer plate 68 contains a plurality of holes 100 that are each aligned with the openings 98 in the retaining ring and which allow the studs 88 to pass therethrough. The plate 68 nests within the retaining ring 66 and has a thickness that is no thicker than the flanged rim 96 which is located on the periphery of the retaining ring 66. A plurality of lug nuts 69 is threaded on the studs 88 and used to hold the assembly of the plate 68, the ring 66, the cover 64, and the wheel 62 in a fixed relationship. It will be noted that the lug nut 69 are Chevrolet supplied lug nuts and do not contain flanges as are contained on the lug nuts 22 that are supplied by Ford as illustrated in connection with FIG. 1. In all other respects, the assembly of the parts is the same and the original equipment supplied by the manufacture is always used.

The universal center hub 70 is identical with the universal hubs 24 illustrated in connected with FIG. 2 and contains a plurality of holes 102 that are aligned so as to expose the lug nuts 69. The diameter of the holes 102 is greater than the diameter of the lug nuts 69 in order to allow individual lug nut extenders 72 to be frictionally placed over the periphery of the lug nuts 69 and thereby allow decorative lug nuts to be used. The hub 70 also contains a flanged rim 71 defining a shoulder portion that is adapted to frictionally engage the shoulder portion defined by the flanged rim 96 located on ring 66.

The Chevrolet lug nut 69 has a smaller diameter than the Ford lug nuts and hence it may be necessary to use a second set of lug nut extenders 74 which are frictionally positioned over the lug nut extenders 72 in order to obtain a projection of the extenders 74 beyond the surface 104 of the hub 70.

The decorative lug nut cover 76 each have a flanged portion 106 on the bottom most portion thereof in order to contact hub 104 when the lug nut covers 76 are frictionally inserted over the lug nut extenders 76. In this fashion, all exposed parts are covered, and the viewer when looking at the Chevrolet wheel in the assembled condition will have the same visual effect as when looking at the Ford wheel as indicated in connection with FIG. 2.

Referring now to FIG. 5, there is shown a partial cross-sectional view of FIG. 4 illustrating the lug nut 69 attaching the plate 68 and maintains the ring 66, the cover 64, and the wheel 62 in a fixed relationship. The hub 70 is frictionally attached along the shoulder formed by the flanged rim 71 to the shoulder portion formed by the flanged rim 96 associated with the ring 66 and in the same manner as described in connection with FIG. 2 and 3. The first extender 72 is frictionally place over the lug nut 69 because the studs 88 on the Chevrolet wheels are shorter than the studs 34 associated with the Ford wheels. The addition, extenders 72 and 74 are therefore needed to allow the decorative wheel cover 76 to be placed thereover and complete the ornamental package.

Referring now to FIG. 6, there is shown another embodiment for eliminating the need of lug nut extenders 72 and 74 as illustrated in FIG. 4 and lug nut extenders 26 as illustrated FIG. 2.

There is shown a decorative lug nut cover 110 fixedly attached to a universal hub cover 112 of the type that is otherwise identical with hub 24 as shown in FIG. 2 and hub 70 as shown in FIG. 4. The ornamental lug nut cover 110 is welded along the periphery 114 of the opening 116 located on the hub 112. In this fashion, the decorative lug nut cover 110 is made a part of the hub 112 thereby eliminating the need for extenders 26 as illustrated in FIG. 2 and the extenders 72 and 74 illustrated in FIG. 4.

In this fashion the user can obtain simulated custom wheels for his single or dual wheel and can have the illusion of a large installation with large lug nuts and still use all the original equipment as supplied by the manufacture.

We claim:

1. A universal decorative wheel covering for use with automotive or truck wheels;
   - a decorative wheel cover having a substantially concave shape and matching holes adapted to accept attaching studs used to hold wheels;
   - a circular retaining ring having a flanged rim on the periphery defining a shoulder portion and located adjacent the wheel cover with the shoulder portion pointing away from the wheel, whereby the attaching studs project through said cover and said retaining ring;
   - a plurality of lug nuts, one for each stud, for securing said retaining ring and said cover to said wheel in a fixed relationship;
   - a universal center hub having matching holes aligned with said studs and each hole having a diameter sufficient to expose said lug nut;
   - said universal center hub having a flanged rim on the periphery defining a shoulder portion adapted to frictionally engage said shoulder portion on said retaining ring whereby the center hub is supported and held only by the frictional relationship existing between the shoulder portion on said retaining ring and the shoulder portion on said center hub; and
   - a plurality of decorative lug nut covers, one for each stud, for covering each of said lug nuts whereby the wheel is covered by the decorative cover and the lug nuts are covered by the decorative lug nut covers.

2. A combination according to claim 1 in which said decorative lug nuts are fixedly attached to said universal center hub and completely cover said matching holes.

3. A combination according to claim 1 in which said decorative lug nut has a flanged base area for bearing against said universal center hub for covering said matching holes.

4. A combination according to claim 1 which includes lug nut cover extension members adapted to be frictionally inserted over each lug nut for extension beyond said universal center hub; and in which
   - each of said decorative lug nut covers is adapted to be frictionally inserted over each of said extension members in order to support and hold each of said decorative lug nuts against said universal center hub.

5. A combination according to claim 1 in which said decorative lug nut covers are each frictionally attached to said lug nuts.

6. A combination according to claim 1 which includes a solid circular retaining plate having matching holes adapted to accept attaching studs used to hold the wheels; and in which
   - the diameter of said retaining plate is less than the diameter of said retaining ring whereby said plate can nest between said retaining ring and said universal center hub.

7. A combination according to claim 1 in which said lug nuts have a flanged circular end portion for bearing against said retainer ring.

* * * * *